May 22, 1962   J. GASSMANN ETAL   3,035,560
FREE PISTON UNITS
Filed Jan. 26, 1959   2 Sheets-Sheet 2
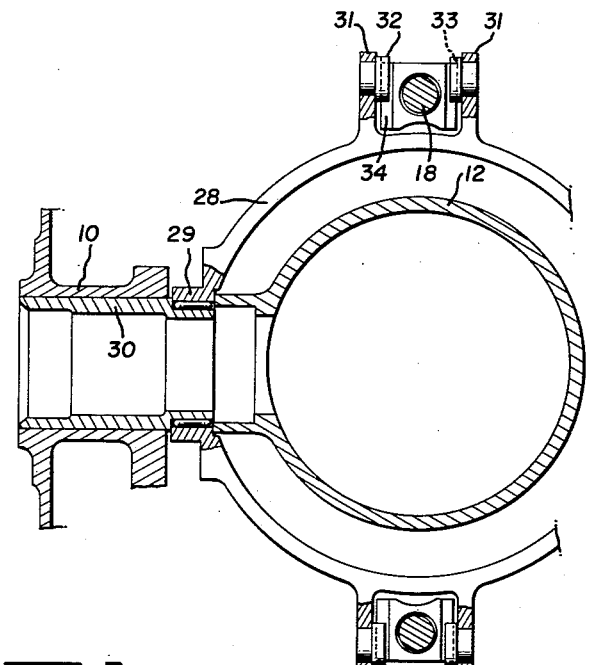
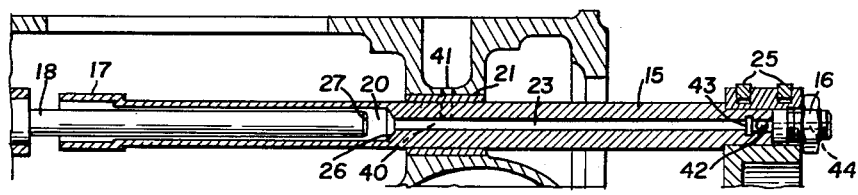
INVENTORS
JOHANNES GASSMANN
SIEGFRIED MAIER
BY
ATTORNEYS

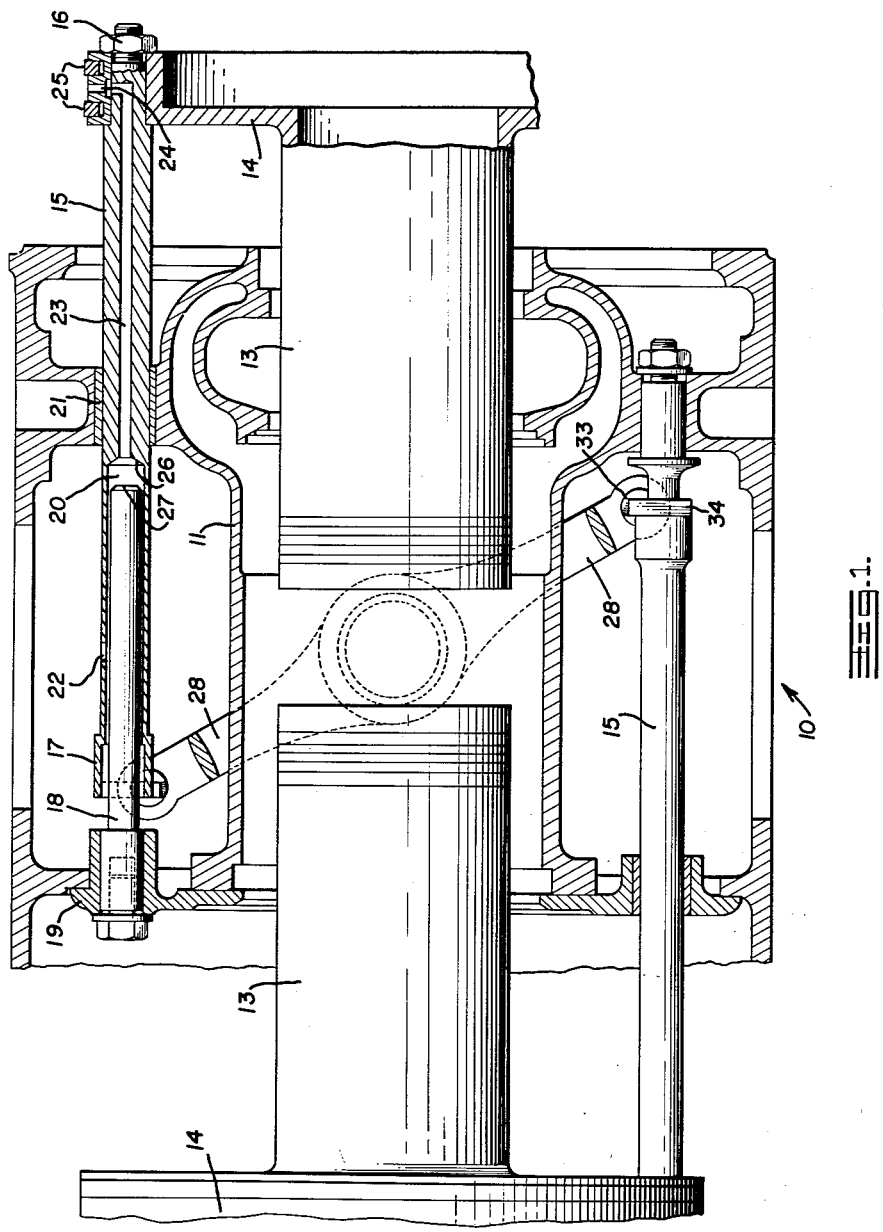

United States Patent Office

3,035,560
Patented May 22, 1962

3,035,560
FREE PISTON UNITS
Johannes Gassmann, Altbach, near Esslingen (Neckar), and Siegfried Maier, Stuttgart-Unterturkheim, Germany, assignors to Daimler-Benz Aktiengesellschaft, Stuttgart-Unterturkheim, Germany
Filed Jan. 26, 1959, Ser. No. 788,888
Claims priority, application Germany Jan. 31, 1958
22 Claims. (Cl. 123—46)

The present invention relates to a free-piston unit and arrangement thereof, and more particularly to a synchronization arrangement for a free-piston aggregate provided with pistons arranged in a combustion cylinder and operating in opposite direction whereby the piston rear ends simultaneously are constructed as compressor pistons.

Free-piston aggregates or units of the type mentioned hereinabove are known per se in the prior art. However, the two pistons operating in opposite directions have to be synchronized thereby by means of a separate special linkage.

The present invention aims at providing a synchronizing linkage of relatively light weight, small dimensions, and inexpensive in manufacture thereof that is particularly suited for relatively small free-piston aggregates or units.

The problems normally encountered with such a construction are solved in accordance with the present invention by securing to each compressor piston at least one guide rod directed toward the other piston, by constructing the guide rod in a hollow manner at the free end thereof and by supporting the guide rod with the hollow part thereof on a pin member secured to the engine housing or casing or a part thereof so as to be displaceable in the longitudinal direction thereof and by connecting the same with the other guide rod of the opposite piston by means of a swinging lever engaging at the free ends of both guide rods. It is particularly appropriate in connection therewith if each guide rod, in addition to the support thereof at the free end on the respective pin member, is further supported, approximately at one half the length thereof, once more in or at the engine housing or casing or at a part thereof so as to be displaceable in the longitudinal direction.

According to a further feature in accordance with the present invention, the pin member may simultaneously be constructed as pump piston and the hollow part of the guide rod as pump cylinder whereby such auxiliary pump arrangement may serve as supply pump, for example, for lubricating purposes or as an auxiliary compressor. In the former case, for example, oil vapor may be supplied thereby to the main compressor piston and the hollow part of the guide rod is provided for purposes of suction with a lateral aperture and is in communication or operatively connected over a longitudinal bore with a further lateral aperture or bore terminating along the periphery of the compressor main piston.

According to another feature of the present invention, this auxiliary pump arrangement may be used for purposes of highly compressing air, for example, for purposes of starting the unit. The valves and channels or conduits necessary therefor are appropriately arranged within the pin member itself and/or within the guide rod.

The swinging lever operatively connecting the ends of two corresponding guide rods is constructed of annular shape and is pivotally supported on both sides of the combustion cylinder. The connection of the swinging lever with the guide rods thereby takes place over slide members or slide shoes. Furthermore, the pivotal support of the swinging lever is so constructed at least on one side of the cylinder that an injection nozzle or any other suitable device necessary for the operation and/or control of the internal combustion cylinder is arranged within this pivotal support.

Accordingly, it is an object of the present invention to provide a free-piston unit obviating the disadvantages of the prior art and resulting in a compact, simple and purposeful arrangement.

It is another object of the present invention to provide a synchronization arrangement for a free-piston unit which is simple in construction, inexpensive in manufacture and which does not require much space.

A further object of the present invention resides in the provision of an inexpensive, compact and light-weight synchronization linkage, particularly suitable for relatively small free-piston aggregates.

Another object of the present invention is the provision of a guide arrangement which effectively serves for purposes of lubrication and/or which also may be used as a starter.

Still another object of the present invention is the provision of an appropriate reliable guide arrangement for a free-piston aggregate which uses relatively light-weight parts and which is so arranged and supported as to minimize stresses in the guide rods thereof.

A still further object of the present invention is the provision of a synchronization arrangement for a free-piston aggregate provided with a suitable guide arrangement in which the synchronization is pivotally supported on the cylinder in such a manner that the pivotal support thereof may also serve to accommodate appropriate control means for the combustion operation of the free-piston aggregate.

These and other object features and advantages of the present invention will become more obvious from the following description when taken in connection with the accompanying drawing which shows, for purposes of illustration ony, two embodiments in accordance with the present invention, and wherein.

FIGURE 1 is a longitudinal cross-sectional view of the free-piston aggregate in accordance with the present invention in which the cylinder sleeve or liner has been omitted for sake of clarity, FIGURE 2 is a transverse cross-sectional view through the free-piston aggregate of the present invention as shown in FIGURE 1, and FIGURE 3 is a partial longitudinal cross-sectional view of a free piston aggregate of another embodiment of the present invention.

Referring now to the drawing wherein like reference numerals are used throughout the views thereof to designate like parts, reference numeral 10 generally designates therein the engine housing. A combustion cylinder is arranged within the engine housing 10 as a source of power or prime mover. The combustion cylinder includes, within cooling jacket 11 (FIGURES 1 and 2) a cylinder 12 (shown only in FIGURE 2) which may be constructed as a wet cylinder liner or sleeve. Two oppositely operating pistons 13 are arranged within cylinder 12 constituting the pistons of the internal combustion engine which carry at the same time at the rear ends thereof the compressor pistons 14 having a considerably larger cross-section or which simultaneously may form such compressor pistons 14 at the rear ends thereof. Additional cylinders, of any suitable construction and, therefore, not illustrated herein, serve for purposes of accommodating the compressor pistons 14. Such additional compressor cylinders may be constructed as separate parts of the engine housing and may be secured in any suitable manner at the central engine housing part 10.

One guide rod 15 each is suitably secured, for example, by means of a threaded connection, at each compressor piston 14. Each guide rod 15 is thereby directed toward the opposite piston, and is constructed at the free end 17 thereof in a hollow manner and is supported on a pin member 18 so as to be longitudinally displaceable, which pin member 18, in turn, is secured either at the engine housing 10 or at a separate cover part 19 suitably secured thereto. Each guide rod 15 is provided with a hollow cylindrical part 20 so that a corresponding pin member 18 extends within the hollow cylindrical part 20 and enables longitudinal movement with respect thereto. A further support for guide rod 15 at the engine housing 10 or at a part suitably secured thereto may take place by means of an additional bearing support 21, utilizing any suitable bearing bushing or the like, disposed approximately at the mid portion of the length of the guide rod 15. As a result of this guide arrangement of the guide rod 15 with respect to the pin member 18, the guide rod 15 cannot bend under the influence of lateral forces, and accordingly, a relatively light weight construction of the rod 15 and also of the pin member 18 itself is, therefore, rendered possible.

The pin member 18 thereby forms together with the hollow part 20 of the guide rod 15 a pump arrangement. This intentional result and effect of the guide arrangement in accordance with the present invention may be used for the most varied purposes. In the embodiment illustrated in FIGURES 1 and 2, the pump arrangement serves for purposes of supplying oil-vapor to the compressor pistons 14 and thereby serves for the lubrication thereof. For that purpose, the hollow part 20 of the guide rod 15 is provided with a lateral aperture or bore 22 which serves as suction path of the described pump arrangement. While these details have only been shown in FIGURE 1 for the upper guide rod arrangement, it is understood that a similar pump arrangement may be used in connection with the lower guide rod arrangement not shown in cross-section in FIGURE 1. The hollow part 20 of the guide rod 15 is operatively connected or in communication through a longitudinal bore 23 with one or several cross bores 24 which discharge appropriately at the periphery of the compressor piston 14 between the piston rings 25 thereof.

The operation of the pump arrangement used with the free-piston aggregate in accordance with the embodiment of FIGURES 1 and 2 is as follows:

During the working stroke of the internal combustion engine, i.e., with a movement toward the right of the right compressor piston 14, oil-vapor is drawn in out of the engine housing 10 over aperature or bore 22 into the hollow part 20 of the guide rod serving as pump cylinder. With a left movement of the right compressor piston 14, the pin member 18 now forces the oil-vapor over the longitudinal bore 23 and out through the one or several cross bores 24 around the circumference of the compressor piston 14 which thereby receives an intensive lubrication.

The pump-like effect of the guide and support arrangement of the guide rod in accordance with the present invention, however, may also be used for other purposes, for example, for producing a high-compression of air to serve, for instance, for purposes of starter. The embodiment illustrated in FIGURE 3 shows the guide rod arrangement utilized as an air compressor pump. A bore 44 is provided extending through bolt 16 and the associated threaded member to provide an air intake into the longitudinal bore 23. Ball valve 42 functions as a suction valve and is secured within bore 23 by pin member 43. A transverse bore 40 is provided in guide rod 15 to act as a regulating valve in conjunction with bore 41 which extends through bearing support 21. When bores 40 and 41 are in their aligned position illustrated in FIGURE 3, compressed air from longitudinal bore 23 may exit therethrough. It is also possible to arrange the suction valve in the guide rod 15 at the bottom 26 of the hollow part 20 and to provide the pressure valve on the end face 27 on the pin member 18.

Two corresponding guide rods 15 of oppositely arranged pistons are operatively connected with each other, for purposes of assuring a positive synchronization of both pistons 13, by means of a swinging lever 28. As shown in FIGURE 2, the synchronization swinging lever 28 is of annular shape made of one or two parts and surrounds the cylinder 12 while at the same time being suitably pivotally supported on both sides of the cylinder 12. At least on one side, the pivotal support of the swinging lever 28 on the cylinder 12 is so constructed that an injection nozzle (not illustrated) or any other device or control arrangement necessary for the operation of the unit may be accommodated therein. The hub 29 of the swinging lever 28 is pivotally supported on an insert piece 30 which forms the connection between the engine housing 10 and the cylinder 12. Any suitable control device, for example, an injection nozzle, may then be arranged within the insert piece 30.

The annularly shaped swinging lever 28 engages each of the guide rods 15 in a plane perpendicular to the pivotal support thereof. For that purpose, the swinging lever 28 is constructed in a fork-like manner at the free ends thereof and surrounds with the fork-like cheek portions 31 the free ends 17 of the guide rods 15. Slide members 32 are rotatably inserted with the pin-like portions thereof in the fork-shaped cheek portions 31 of swinging lever 28 and are each provided with a longitudinal groove 33 corresponding to the complementary vertical guide-ledge portions 34 provided at the free ends of the guide rods 15. In that manner the to-and-fro movements of both oppositely moving pistons 13 are synchronized.

While we have shown and described two embodiments in accordance with the present invention, it is understood that the same is not limited thereto but is susceptible of many changes and modifications within the spirit and scope of the present invention. For example, the pump arrangement formed by the guide-rod-and-pin assembly in accordance with the present invention may be used simultaneously for purposes of providing the necessary lubrication and also for purposes of providing a high-compressor arrangement to serve as a starter. For that purpose one or several hollow guide-rod pin-member pump arrangements may serve the former while one or several hollow guide-rod pin-member pump arrangements may serve the latter purpose. It is also understood that more than two hollow guide-rod pin-member pump arrangements may be provided. In that case the synchronizing swinging lever 28 may be suitably modified to synchronize all of the pump arrangements. For example, instead of providing a single fork-shaped end on each of the two free ends of the swinging lever 28 shown herein, two or more forked-shaped projections may be provided to synchronize a corresponding number of pump arrangements.

Thus, it is obvious that the present invention is not limited to the specific details disclosed herein but is susceptible of many changes and modifications without departing from the spirit and scope of the present invention, and we, therefore, do not wish to be limited to the specific embodiments illustrated therein but intend to cover all such changes and modifications as are encompassed by the appended claims.

We claim:

1. A synchronization arrangement for a free-piston aggregate, comprising cylinder means constituting a combustion cylinder, oppositely operating piston means in said combustion cylinder, a relatively stationary engine part, guide means including guide rod means each secured to a respective piston means at one end thereof, pin means each secured at one end thereof to said relatively stationary part, one of each the two parts consisting of said guide rod means and of said pin means being provided at the other end thereof with a hollowed-out portion for supporting the other of said two parts and thereby supporting the same at said relatively stationary part, said guide rod means being provided with aperture means extending axially thereof and in communication with said hollowed-out portion, and synchronizing means including connecting means pivotally supported on said stationary part for operatively connecting the free ends of said guide rod means with the free ends of said connecting means to thereby synchronize the movement of said piston means.

2. A synchronization arrangement for a free-piston aggregate according to claim 1, wherein each respective guide rod means and pin means constitute auxiliary pump means.

3. A synchronization arrangement for a free-piston aggregate according to claim 2, wherein said connecting means includes a swinging lever and is supported on both sides of said combustion cylinder.

4. A synchronization arrangement for a free-piston aggregate, comprising cylinder means constituting a combustion cylinder, oppositely operating piston means in said combustion cylinder, a relatively stationary engine part, guide means including guide rod means each secured to a respective piston means at one end thereof and provided with a hollowed-out portion at the other end thereof, pin means secured to said relatively stationary part engaging a respective hollowed-out portion and thereby supporting the same at said relatively stationary part, and synchronizing means including lever means having a substantially annular configuration at least partially surrounding said combustion cylinder and pivotally supported on said stationary part for operatively connecting the free ends of said guide rod means to thereby synchronize the movement of said piston means.

5. A synchronization arrangement for a free-piston aggregate, according to claim 4, further comprising additional support means for slidably supporting each of said guide rod means within the mid-portion thereof at said relatively stationary part.

6. A synchronization arrangement for a free-piston aggregate, comprising cylinder means constituting a combustion cylinder, oppositely operating piston means in said combustion cylinder, a relatively stationary engine part, guide means including guide rod means each secured to a respective piston means at one end thereof and provided with a hollowed-out portion at the other end thereof, pin means secured to said relatively stationary part engaging a respective hollowed-out portion and thereby supporting the same at said relatively stationary part, said hollowed-out portions constituting auxiliary cylinder means and said pin means constituting auxiliary piston means to thereby provide auxiliary support pump means, and synchronizing means including swinging lever means pivotally supported on said stationary part and at least partially surrounding said combustion cylinder for operatively connecting the free end faces of said guide rod means to thereby synchronize the movement of said piston means.

7. A synchronization arrangement for a free-piston aggregate, according to claim 6, wherein said auxiliary supply pump means forms an auxiliary lubricating pump.

8. A synchronization arrangement for a free-piston aggregate, according to claim 7, wherein said hollowed-out portion is provided with a lateral intake aperture to draw-in therethrough oil vapor, and output means including a longitudinal bore in said guide rod means terminating in said hollowed-out portion, and discharge aperture means in said aggregate in communication both said longitudinal bore and discharging therethrough the lubricating oil vapor.

9. A synchronization arrangement for a free-piston aggregate, according to claim 8, wherein each of said oppositely operating piston means is provided at the rear end thereof with a compressor piston, and wherein said discharge aperture are provided laterally at said compressor pistons.

10. A synchronization arrangement for a free-piston aggregate, according to claim 6, wherein said auxiliary pump means form an air compressor pump serving as starter and said auxiliary pump means include valve means and conduit means arranged in at least one of said pin means and guide means.

11. A synchronization arrangement for a free-piston aggregate, comprising cylinder means constituting a combustion cylinder, oppositely operating piston means in said combustion cylinder, a relatively stationary engine part, guide means including guide rod means each secured to a respective piston means at one end thereof and provided with a hollowed-out portion at the other end thereof, pin means secured to said relatively stationary part engaging a respective hollowed-out portion and thereby supporting the same at said relatively stationary part, said hollowed-out portions and said pin means constituting auxiliary pump means, and synchronizing means including swinging lever means at least partially surrounding said combustion cylinder and pivotally supported on said stationary part for operatively connecting the free ends of said guide rod means at the free ends of said lever means to thereby synchronize the movement of said piston means.

12. A synchronization arrangement for a free-piston aggregate, according to claim 11, further comprising insert means connecting said relatively stationary part with said combustion cylinder, said swinging lever including a hub portion pivotally secured thereat on said insert means, said insert means also being provided with cavity means adapted to accommodate therein injection nozzle means.

13. A synchronization arrangement for a free-piston aggregate, according to claim 11, wherein said swinging lever means surrounds with each free end thereof a respective guide rod means in a fork-like manner, and means slidably guiding each fork-line end of said swinging lever means with respect to said guide rod means.

14. A synchronization arrangement for a free-piston aggregate, according to claim 13, wherein said last-mentioned means includes slide shoe means each having a pin portion rotatably inserted into a respective fork-shaped end portion, one of the two parts each consisting of said guide rod means and said slide shoe means being provided with a ledge portion engaging in a complementary groove provided in the other part.

15. A synchronization arrangement for a free-piston aggregate, comprising cylinder means constituting a combustion cylinder, oppositely reciprocating piston means in said combustion cylinder including compressor piston means provided on the rear end thereof, a relatively stationary engine part, guide means including guide rod means each secured at one end thereof to a respective compressor piston means, pin means each secured at one end thereof to said relatively stationary part, said guide rod means being provided at the other end thereof with a hollowed-out portion including bearing means at the free end thereof, the free end of said pin means slidably engaging the bearing means in said hollowed-out portion to thereby slidably support said guide rod means at said stationary part, synchronizing means including swinging lever means, and guide means directly adjacent said bearing means extending in a direction essentially perpendicular to the axis of said guide rod means for slidably connecting the free ends of said lever means with a respective free end of said guide rod means to thereby synchronize the movement of said piston means.

16. A synchronization arrangement for a free-piston aggregate according to claim 15, further comprising additional bearing means for additionally and slidably supporting each of said guide rod means within essentially the mid-portion thereof at said relatively stationary part.

17. A synchronization arrangement for a free-piston aggregate according to claim 15, wherein said hollowed-out portion constitutes auxiliary cylinder means and said piston means constituting auxiliary piston means to thereby provide auxiliary supply pump means forming an auxiliary compressor.

18. A synchronization arrangement for a free-piston aggregate according to claim 17, wherein said hollowed-out portion is provided with a lateral intake aperture to draw in therethrough oil vapor, and output means including a longitudinal bore in said guide rod terminating in said hollowed-out portion, and discharge aperture means in said compressor piston means in communication with said longitudinal bore for discharging therethrough oil vapor supplied by said auxiliary pump means to thereby lubricate said compressor piston means.

19. A synchronization arrangement for a free-piston aggregate according to claim 15, wherein said swinging lever means includes a substantially ring-shaped lever essentially surrounding said cylinder means and pivotally supported at each side thereof.

20. A synchronization arrangement for a free-piston aggregate according to claim 19, further comprising insert means connecting said relatively stationary part with said combustion cylinder, said ring-shaped lever including at least one hub portion pivotally secured thereat on said insert means, said insert means also being adapted to accommodate therein a device such as the injection nozzle.

21. A synchronization arrangement for a free-piston aggregate according to claim 20, wherein said ring-shaped lever surrounds with each free end thereof a respective guide rod means in a fork-like manner, said guide rod means including slide shoe means provided on each side of the fork-like ends for slidably guiding said ends on said guide rod means in a transverse direction thereto.

22. A synchronization arrangement for a free-piston aggregtae according to claim 21, wherein said slide shoe means includes a pin portion rotatably inserted into a respective fork-shaped end portion and including groove means, the free ends of said guide rod means being provided with a ledge portion engaging in said groove means.

References Cited in the file of this patent

UNITED STATES PATENTS

| | | |
|---|---|---|
| 1,747,948 | Pescara | Feb. 18, 1930 |
| 2,795,927 | Huber | June 18, 1957 |